(12) United States Patent
Walter et al.

(10) Patent No.: US 11,533,904 B2
(45) Date of Patent: Dec. 27, 2022

(54) HUNTING STAND

(71) Applicant: Wild Edge, Inc., Moodus, CT (US)

(72) Inventors: Andrew G. Walter, Moodus, CT (US); Matthew A. Garis, Enid, OK (US)

(73) Assignee: WILD EDGE, INC., Moodus, CT (US)

( * ) Notice: Subject to any disclaimer, the term of this patent is extended or adjusted under 35 U.S.C. 154(b) by 385 days.

(21) Appl. No.: 16/804,210

(22) Filed: Feb. 28, 2020

(65) Prior Publication Data

US 2021/0267188 A1  Sep. 2, 2021

(51) Int. Cl.
*A01M 31/02* (2006.01)
*A45F 3/26* (2006.01)
*A63B 27/02* (2006.01)

(52) U.S. Cl.
CPC ............ *A01M 31/02* (2013.01); *A45F 3/26* (2013.01); *A63B 27/02* (2013.01)

(58) Field of Classification Search
CPC .......... A01M 31/02; A63B 27/02; A45F 3/26; E04C 1/34
USPC ........................................... 182/92, 133, 187
See application file for complete search history.

(56) References Cited

U.S. PATENT DOCUMENTS

| | | | |
|---|---|---|---|
| 2,609,781 A * | 9/1952 | Gruetjen ................. | E04C 2/427 52/180 |
| 2,828,843 A * | 4/1958 | Hill ....................... | B21D 31/043 72/379.6 |
| 3,835,958 A | 9/1974 | Hegele | |
| 3,854,551 A * | 12/1974 | Lindow ................. | A01M 31/02 182/187 |
| 4,600,081 A * | 7/1986 | Wade ..................... | A01M 31/02 182/187 |
| 4,618,028 A * | 10/1986 | Dale ....................... | A63B 27/00 248/230.8 |
| 4,691,804 A * | 9/1987 | Bunker .................. | A01M 31/02 108/92 |
| 4,721,183 A * | 1/1988 | Koniecka .................. | A45F 3/26 182/187 |
| 4,730,700 A * | 3/1988 | Miller .................... | A01M 31/02 182/187 |
| 4,924,972 A * | 5/1990 | Westbrock ............ | A01M 31/02 182/187 |
| D352,558 S * | 11/1994 | Stepp ............................ | D25/62 |
| 5,394,957 A * | 3/1995 | Doby ..................... | A01M 31/02 182/187 |
| 5,409,083 A * | 4/1995 | Thompson ................. | A45F 3/26 182/187 |
| 5,413,192 A * | 5/1995 | Woller .................. | A01M 31/02 182/187 |
| 5,454,445 A | 10/1995 | Berryman | |
| 5,458,215 A * | 10/1995 | Burgin ...................... | A45F 3/26 182/187 |
| 5,469,934 A * | 11/1995 | Pherigo ................. | A01M 31/02 182/187 |

(Continued)

*Primary Examiner* — Robert Canfield
(74) *Attorney, Agent, or Firm* — Cantor Colburn LLP (57) ABSTRACT

A hunting stand includes a step configured for engagement to a support structure. The step includes two step legs configured to engage the support structure, and a crossbar extending between the two step legs. A platform is installed to the step. The platform is configured to at least partially support a person at a top surface of the platform. The platform includes a first engagement feature engaged to the crossbar.

18 Claims, 7 Drawing Sheets

(56) References Cited

U.S. PATENT DOCUMENTS

| | | | | |
|---|---|---|---|---|
| 5,515,943 | A * | 5/1996 | Antonelli | A01M 31/02 182/187 |
| 5,732,793 | A * | 3/1998 | Dech | A01M 31/02 182/187 |
| 5,937,969 | A * | 8/1999 | Woller | A01M 31/02 182/187 |
| 6,397,973 | B1 * | 6/2002 | Woller | A01M 31/02 182/135 |
| 6,431,315 | B1 * | 8/2002 | Lewis | A63B 27/00 182/136 |
| 6,439,343 | B1 * | 8/2002 | Jorges | E06C 9/04 182/187 |
| 8,631,904 | B1 * | 1/2014 | Wilds | A01M 31/02 182/120 |
| 9,782,626 | B2 | 10/2017 | Wakefield, Jr. et al. | |
| 10,595,617 | B2 * | 3/2020 | Teal, Jr. | A47C 9/10 |
| 2005/0145436 | A1 * | 7/2005 | Prejean | A01M 31/02 182/136 |
| 2007/0114096 | A1 | 5/2007 | Skipper | |
| 2013/0341475 | A1 * | 12/2013 | Thompson | A01M 31/02 248/217.4 |
| 2014/0166400 | A1 * | 6/2014 | Berkbuegler | E04G 3/00 182/222 |
| 2017/0258072 | A1 * | 9/2017 | Kaye | A01M 31/02 |
| 2020/0205397 | A1 * | 7/2020 | Adams | A45F 3/26 |
| 2021/0205667 | A1 * | 7/2021 | Garis | E06C 1/34 |
| 2021/0219540 | A1 * | 7/2021 | Schmidt | A45F 3/26 |
| 2021/0329908 | A1 * | 10/2021 | Corl | A01M 31/02 |

* cited by examiner

HUNTING STAND

BACKGROUND

Exemplary embodiments pertain to the art of hunting stands, and in particular to portable hunting stands for mounting in a tree.

Hunters utilize stands, often placed in trees, which provide an elevated vantage point from which to spot, track, and hunt game. While some stands are permanent or semi-permanent structures placed in a set location for a long duration of time, for example, an entire hunting season, it is often desired to change locations of a hunting stand in shorter durations, such as from hour-to-hour, or day-to-day, within a season. For such portable hunting stands, it is desired that the hunting stand be lightweight, easily installed on a tree and also easily removed from a tree, and be relatively small in size and easily packable in, for example, a backpack, which the hunter may easily carry along with him or her from location to location.

BRIEF DESCRIPTION

In one embodiment, a hunting stand includes a step configured for engagement to a support structure. The step includes two step legs configured to engage the support structure, and a crossbar extending between the two step legs. A platform is installed to the step. The platform is configured to at least partially support a person at a top surface of the platform. The platform includes a first engagement feature engaged to the crossbar.

Additionally or alternatively, in this or other embodiments the platform further includes a second engagement feature engaged to the two step legs.

Additionally or alternatively, in this or other embodiments the second engagement feature includes a platform channel formed in a platform base.

Additionally or alternatively, in this or other embodiments the first engagement feature is at least one platform hook located at a bottom side of the platform.

Additionally or alternatively, in this or other embodiments one or more traction-enhancing features are located at a top side of the platform.

Additionally or alternatively, in this or other embodiments the one or more traction-enhancing features are one or more scallops or notches in the top side of the platform.

Additionally or alternatively, in this or other embodiments the platform includes one or more platform rails extending from a platform base.

Additionally or alternatively, in this or other embodiments the platform base abuts the support structure and includes a scallop to improve fit to the support structure.

Additionally or alternatively, in this or other embodiments the platform is formed from a metallic material with one or more coatings applied thereto.

Additionally or alternatively, in this or other embodiments a rope is operably connected to the step to secure the step to the support structure.

Additionally or alternatively, in this or other embodiments the two step legs are joined at a first leg end and extend from the first leg end at a leg angle toward a second leg end.

Additionally or alternatively, in this or other embodiments each step leg includes a curvilinear transition portion between the first leg end and the second leg end.

Additionally or alternatively, in this or other embodiments the two step legs are configured to engage the support structure at each of the first leg end and the second leg end.

In another embodiment, a hunting stand includes a step configured for engagement to a support structure. The step includes two step legs configured to engage the support structure. The two step legs are joined at a first leg end and extend from the first leg end at a leg angle toward a second leg end. The two step legs are configured to engage the support structure at each of the first leg end and the second leg end. A crossbar extends between the two step legs, and a platform is installed to the step. The platform is configured to at least partially support a person at a top surface of the platform. The platform includes a first engagement feature engaged to the crossbar.

Additionally or alternatively, in this or other embodiments the platform further includes a second engagement feature engaged to the two step legs, the second engagement feature comprising a platform channel formed in a platform base.

Additionally or alternatively, in this or other embodiments the first engagement feature is at least one platform hook located at a bottom side of the platform.

Additionally or alternatively, in this or other embodiments one or more traction-enhancing features are located at a top side of the platform.

Additionally or alternatively, in this or other embodiments the one or more traction-enhancing features are one or more scallops or notches in the top side of the platform.

Additionally or alternatively, in this or other embodiments the platform includes one or more platform rails extending from a platform base.

Additionally or alternatively, in this or other embodiments the platform base abuts the support structure and includes a scallop to improve fit to the support structure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
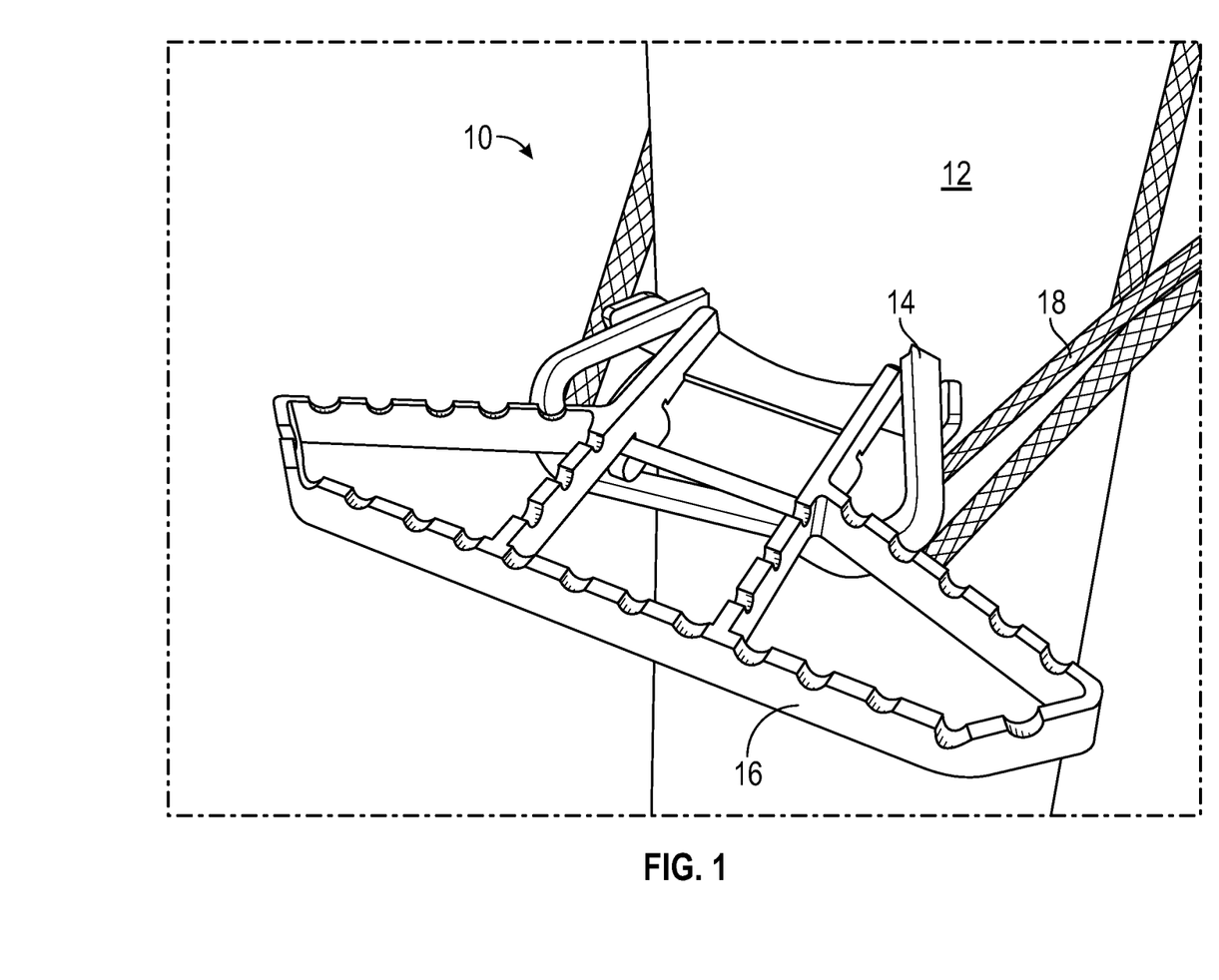
FIG. 1 is a schematic illustration of an embodiment of a hunting stand.

Shown in FIG. 1 is an illustration of an embodiment of a hunting stand 10 installed at a support structure, for example, a tree 12 or alternatively a pole or the like. The hunting stand 10 generally includes a step 14, a platform 16 installed to the step 14, and a securing means such as a rope 18, strap or the like, which secures the step 14 and the platform 16 to the tree 12.

Figure 2:
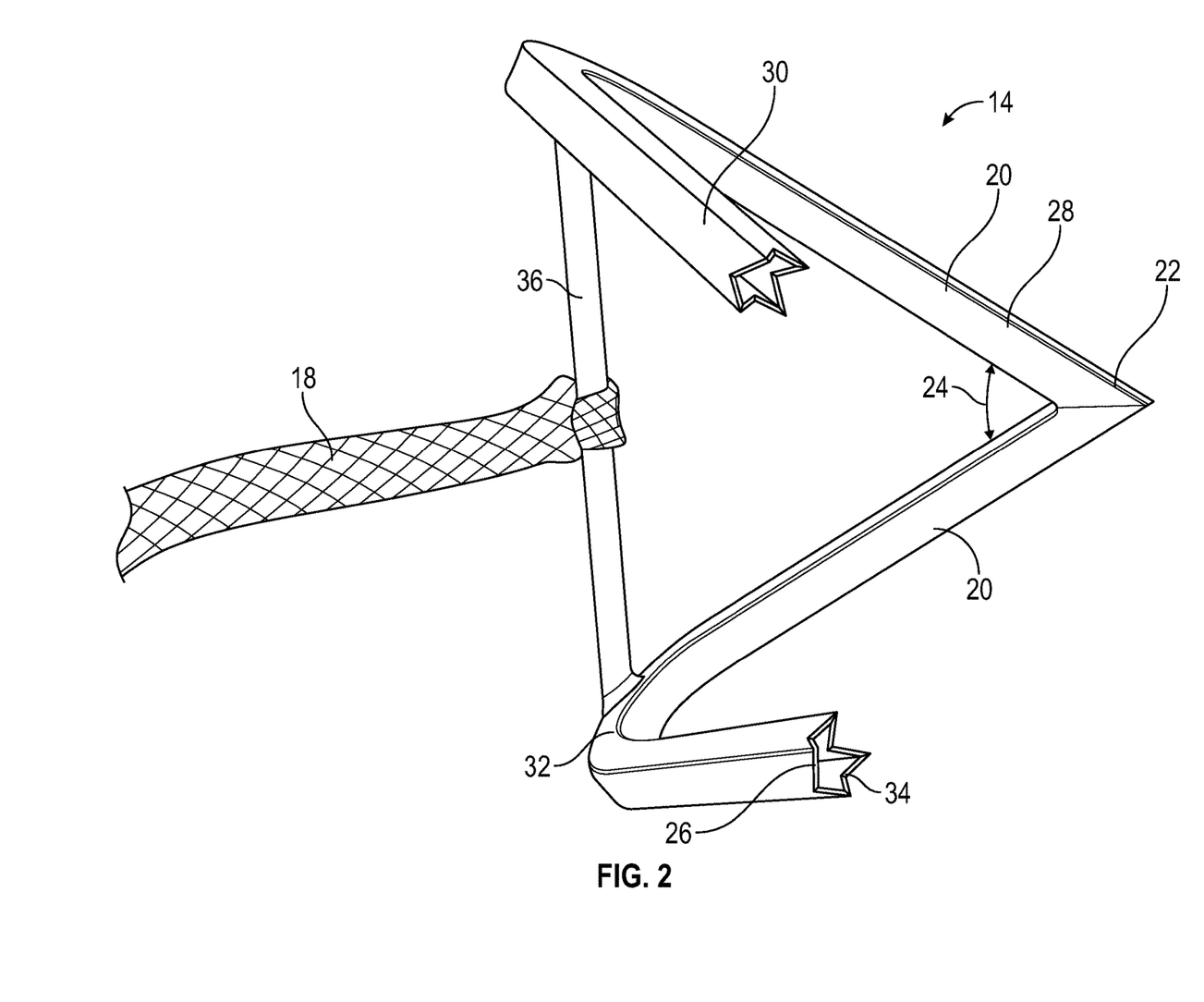
FIG. 2 is an illustration of an embodiment of a step of a hunting stand.
Figure 3:
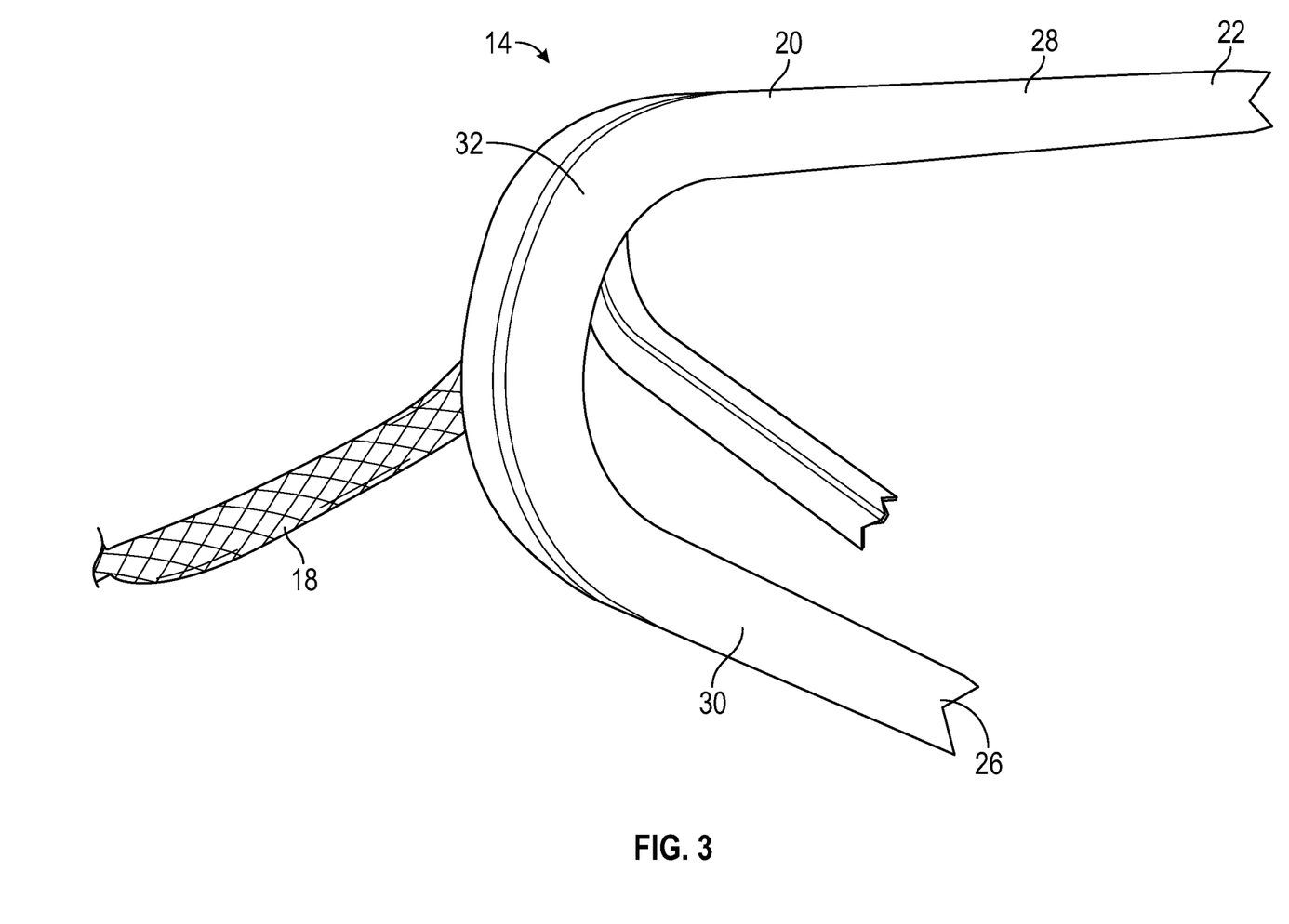
FIG. 3 is another illustration of an embodiment of a step of a hunting stand.

Referring to FIGS. 2 and 3, illustrated is an embodiment of the step 14. The step 14 includes two opposing step legs 20, which meet at a first leg end 22 and extend at a leg angle 24 between the step legs 20 from the first leg end 22 to a second leg end 26. Each step leg 20 has a first leg portion 28 extending from the first leg end 22. In some embodiments, the first leg portion 28 extends substantially linearly along the first leg portion 28. A similarly linear second leg portion 30 extends from the second leg end 26, with a curved leg transition portion 32 connecting the first leg portion 28 and the second leg portion 30. In some embodiments, the first leg end 22 and the second leg end 26 have notches 34 or other features to aid in securing the step 14 to the tree 12. Further, to stabilize the step 14, a crossbar 36 extends between the step legs 20. While one crossbar 36 is shown in the embodiment of FIG. 2, one skilled in the art will readily appreciate that other quantities of crossbars 36, such as two or three crossbars 36 may be utilized. In some embodiments, such as illustrated in FIG. 2, the crossbar is connected to each step leg 20 at the leg transition portion 32. In other embodiments, however, the crossbar 36 may be located at the first leg portion 28 or the second leg portion 30. The step 14 may be formed from a metal material, such as steel, and may further be coated to prevent corrosion or the like. As shown in FIG. 2, the rope 18 is affixed to the step 14 at the crossbar 36 by, for example, splicing, braiding, knotting or the like. In other embodiments, the rope 18 may be secured to the step 14 at one or more of the legs 20.

Figure 4:
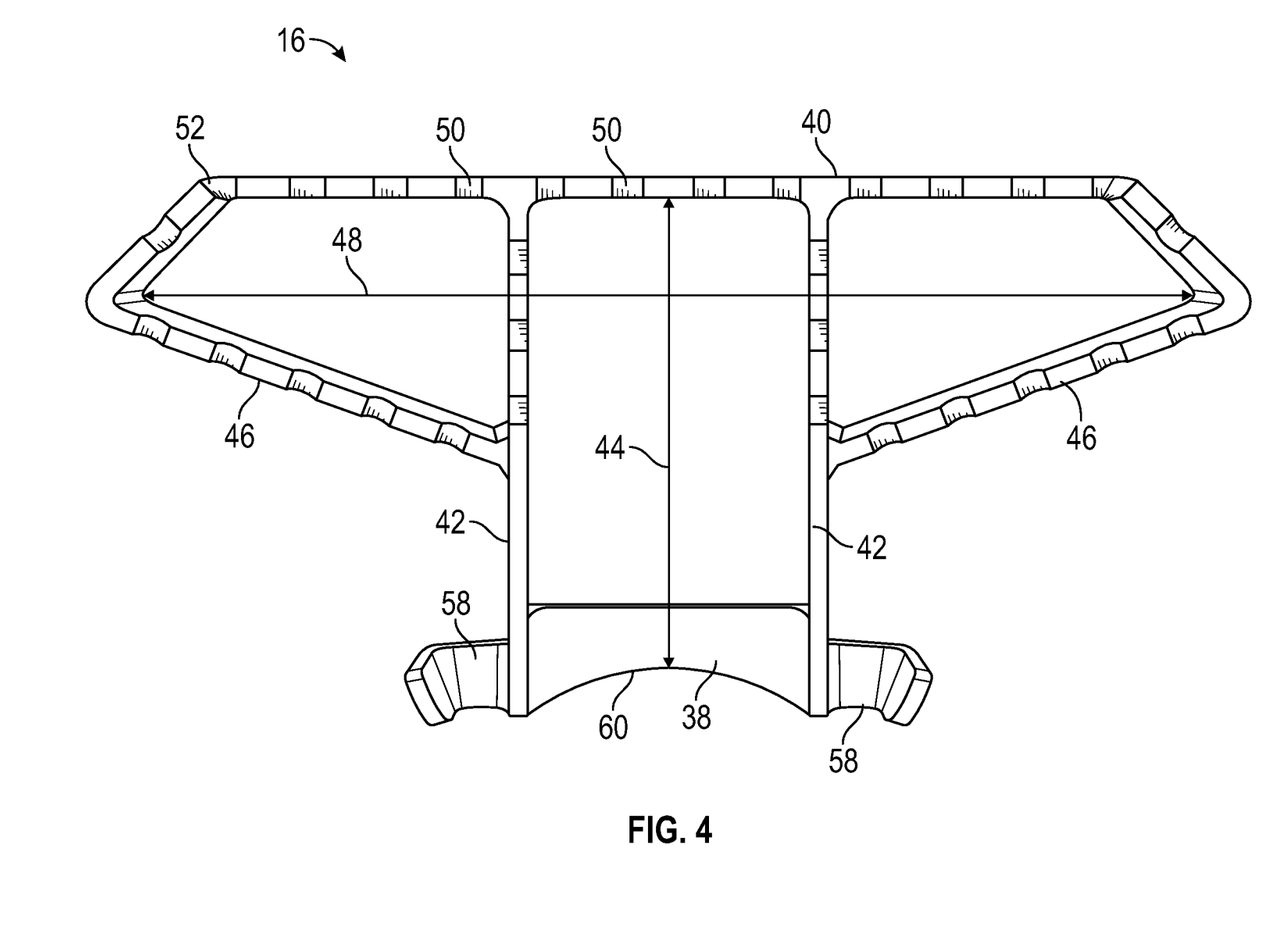
FIG. 4 is an illustration of an embodiment of a platform of a hunting stand.
Figure 5:
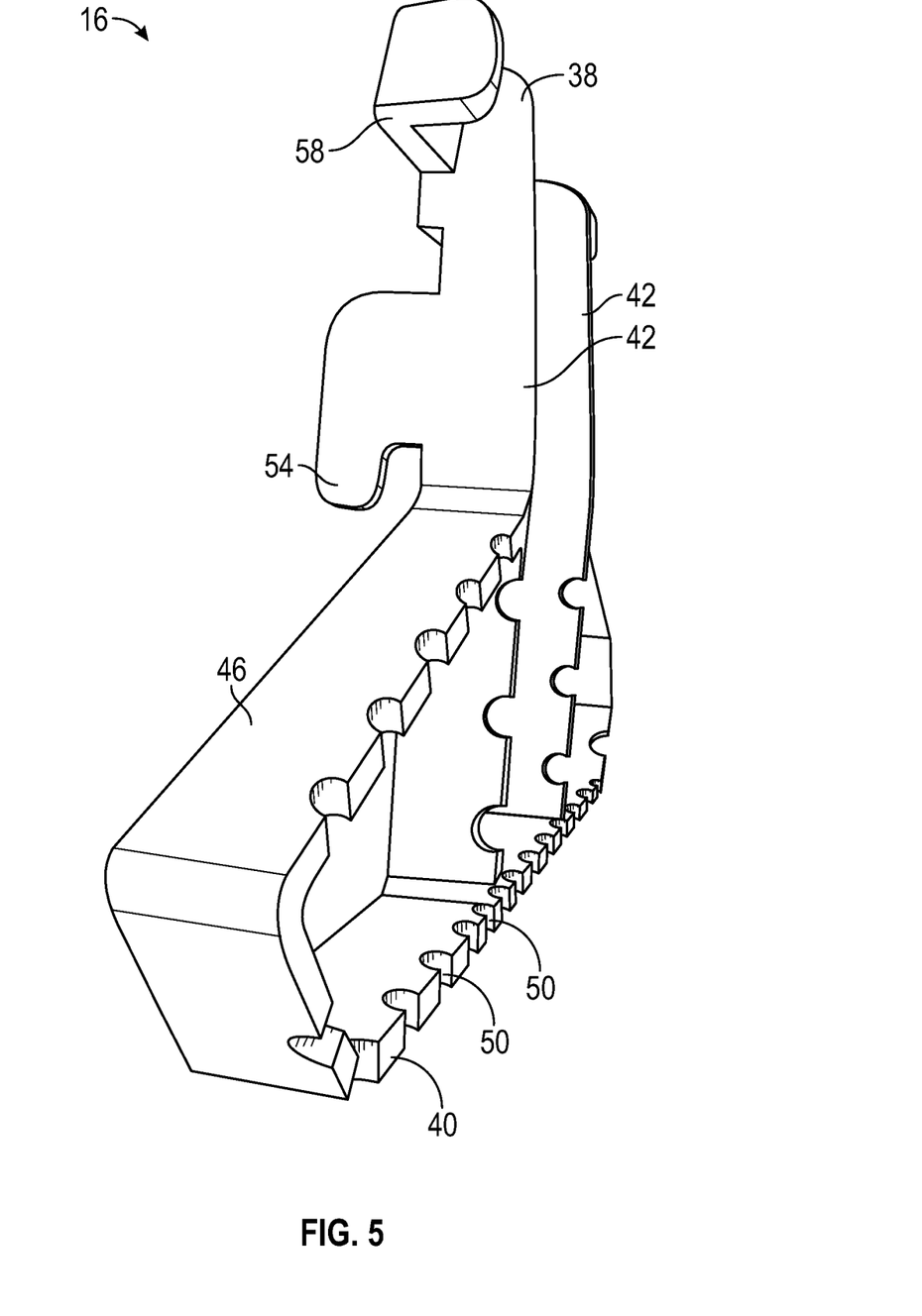
FIG. 5 is another illustration of an embodiment of a platform of a hunting stand.

Referring now to FIGS. 4 and 5, an embodiment of the platform 16 is illustrated. The platform 16 extends from a platform base 38, configured to abut the tree 12, to a platform end 40. The platform 16 includes lengthwise platform rails 42, for example, two lengthwise platform rails 42, extending from the platform base 38 to the platform end 40 to define a platform length 44. Further, widthwise platform rails 46 extend from the lengthwise platform rails 42 to define a platform width 48. The platform 16 may include traction enhancing features 50, such as scallops or notches, at an upper side 52 of the lengthwise platform rails 42 and/or the widthwise platform rails 46, to improve traction of a person stepping or standing on the platform 16. In some embodiments, the platform 16 is formed from an aluminum material, and may include, a coating, for example, a matte powder coat finish prevents any noise, squeak, or shine when using the platform 16.

The platform 16 includes one or more platform hooks 54 located at a bottom side 56 of, for example, the lengthwise platform rails 42 for connection of the platform 16 to the step 14. Specifically, the platform hooks 54 are configured to engage the crossbar 36 of the step 14. Further, the platform base 38 includes two platform base channels 58, one at each widthwise side of the platform base 38. The platform base channels 58 extend upwardly at the upper side 52 of the platform base 38. The platform base channels 58 receive the step legs 20 at installation to the tree 12 to provide additional stability and/or support of the platform 16 by the step 14. Further, the platform base 38 may include a curved base cutout 60, to improve fit of the platform 16 to the tree 12.

Figure 6:
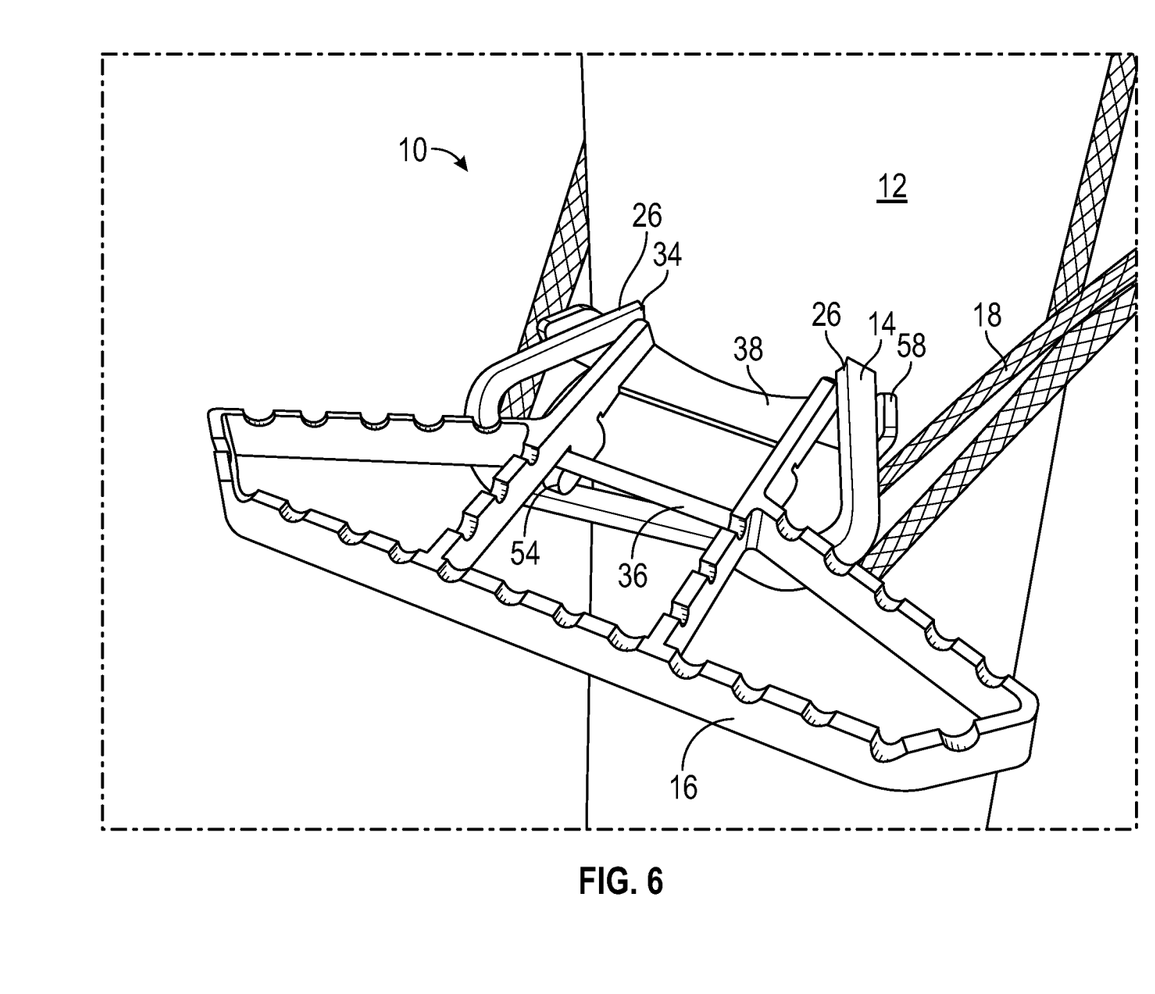
FIG. 6 is an illustration of assembly of a platform to a step.
Figure 7:
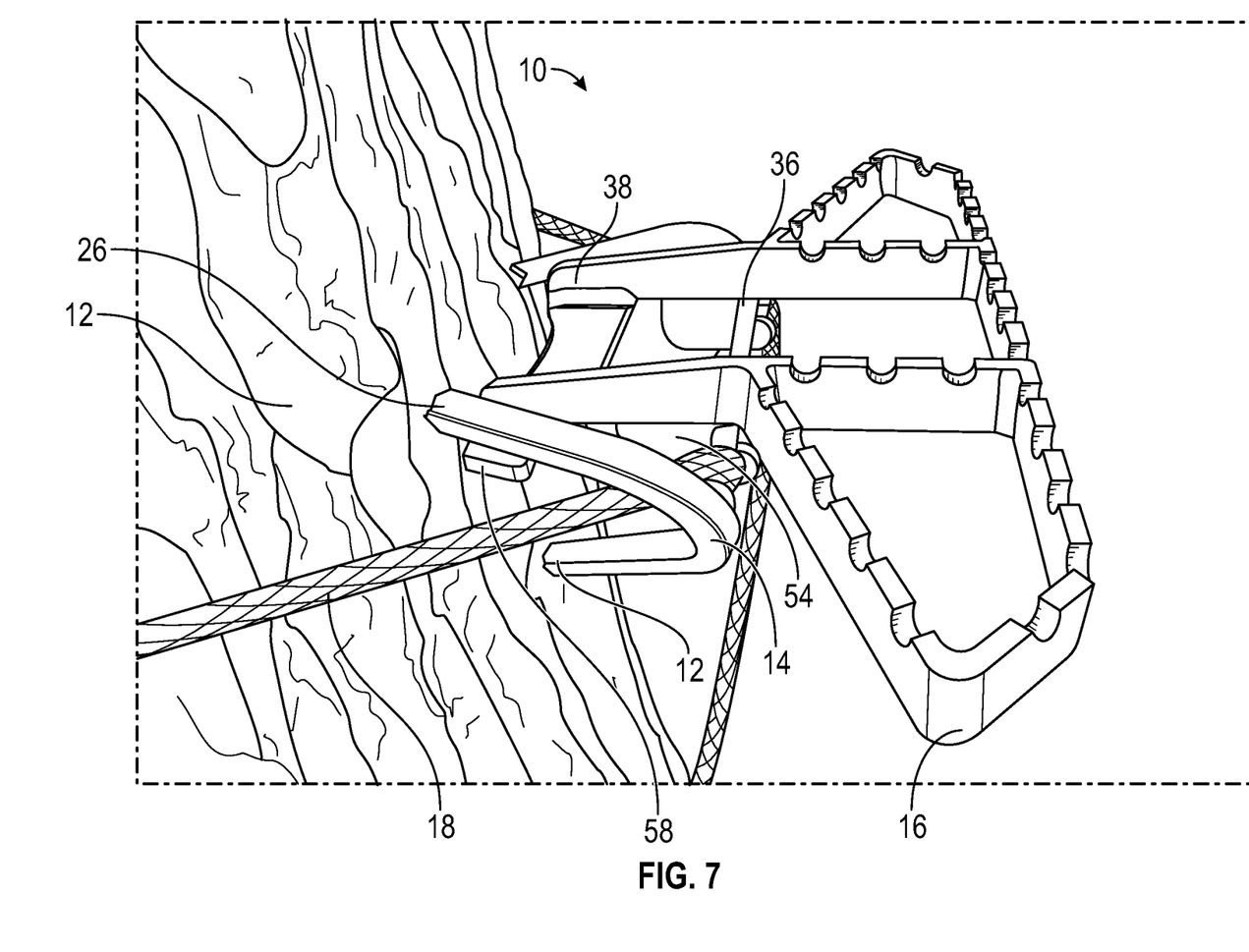
FIG. 7 is another illustration of assembly of a platform to a step.

Referring to FIGS. 6 and 7, shown is an illustration of the hunting stand 10 installed to the tree 12. To install the hunting stand 10 to the tree, the step 14 is installed first to the tree 12, with the first leg end 22 and the second leg ends 26 contacting the tree 12. The second leg ends 26 are located higher along the tree 12, relative to the first leg end 22. The rope 18 is wrapped around the tree 12 and tied to the step 14. As the rope 18 is tightened, the step 14, in particular the first leg end 22 and the second leg ends 26 are drawn into the tree 12, with the notches 34 engaging the tree 12.

The platform 16 is then installed to the step 14, with the platform hooks 54 engaged to the crossbar 36 of the step 14, and the step legs 20 received into the platform base channels 58, with the platform base 38 located under the step legs 20. More specifically, the second leg portion 30 of each step leg 20 is positioned in the platform base channel 58 over the platform base 38. Such installation pivots the platform 16 about the crossbar 36 when weight of, for example, a person, is applied to the platform 16, thus increasing engagement of the step legs 20 into the platform base channels 58. Alternatively, if desired, the platform 16 may be installed to the step 14 prior to installation of the step 14 to the tree 12, with then the step 14/platform 16 subassembly installed to the tree 12.

The hunting stand 10 as disclosed herein is compact, lightweight and easy to pack, and offers a 360 degree shooting range from the platform 16. The platform 16 further includes features to improve traction, and offers high stability. Further, the hunting stand 10 may be included with other accessories, such as a saddle or harness for a hunter to further improve the flexibility and usefulness of the hunting stand 10.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A hunting stand comprising:
   a step configured for engagement to a support structure, the step including:
      two step legs configured to engage the support structure; and
      a crossbar extending between the two step legs; and
   a platform installed to the step, the platform configured to at least partially support a person at a top surface of the platform, the platform including a first engagement feature engaged to the crossbar;
   wherein the platform further includes a second engagement feature engaged to the two step legs; and
   wherein the second engagement feature comprises a platform channel formed in a platform base.

2. The hunting stand of claim 1, further comprising one or more traction-enhancing features disposed at a top side of the platform.

3. The hunting stand of claim 2, wherein the one or more traction-enhancing features are one or more scallops or notches in the top side of the platform.

4. The hunting stand of claim 1, wherein the platform comprises one or more platform rails extending from a platform base.

5. The hunting stand of claim 4, wherein the platform base abuts the support structure and includes a scallop to improve fit to the support structure.

6. The hunting stand of claim 1, wherein the platform is formed from a metallic material with one or more coatings applied thereto.

7. The hunting stand of claim 1, further comprising a rope operably connected to the step to secure the step to the support structure.

8. The hunting stand of claim 1, wherein the two step legs are joined at a first leg end and extend from the first leg end at a leg angle toward a second leg end.

9. The hunting stand of claim 8, wherein each step leg includes a curvilinear transition portion between the first leg end and the second leg end.

10. The hunting stand of claim 8, wherein the two step legs are configured to engage the support structure at each of the first leg end and the second leg end.

11. A hunting stand comprising:
a step configured for engagement to a support structure, the step including:
two step legs configured to engage the support structure; and
a crossbar extending between the two step legs; and
a platform installed to the step, the platform configured to at least partially support a person at a top surface of the platform, the platform including a first engagement feature engaged to the crossbar;
wherein the first engagement feature is at least one platform hook disposed at a bottom side of the platform.

12. A hunting stand comprising:
a step configured for engagement to a support structure, the step including:
two step legs configured to engage the support structure, wherein the two step legs are joined at a first leg end and extend from the first leg end at a leg angle toward a second leg end, the two step legs configured to engage the support structure at each of the first leg end and the second leg end; and
a crossbar extending between the two step legs; and
a platform installed to the step, the platform configured to at least partially support a person at a top surface of the platform, the platform including a first engagement feature engaged to the crossbar.

13. The hunting stand of claim 12, wherein the platform further includes a second engagement feature engaged to the two step legs, the second engagement feature comprising a platform channel formed in a platform base.

14. The hunting stand of claim 13, wherein the platform base abuts the support structure and includes a scallop to improve fit to the support structure.

15. The hunting stand of claim 12, wherein the first engagement feature is at least one platform hook disposed at a bottom side of the platform.

16. The hunting stand of claim 12, further comprising one or more traction-enhancing features disposed at a top side of the platform.

17. The hunting stand of claim 12, wherein the one or more traction-enhancing features are one or more scallops or notches in the top side of the platform.

18. The hunting stand of claim 12, wherein the platform comprises one or more platform rails extending from a platform base.

* * * * *